July 12, 1932.  L. A. JONES  1,866,712
METHOD OF MAKING COMBINED SOUND AND PICTURE RECORDS
Filed Feb. 5, 1930
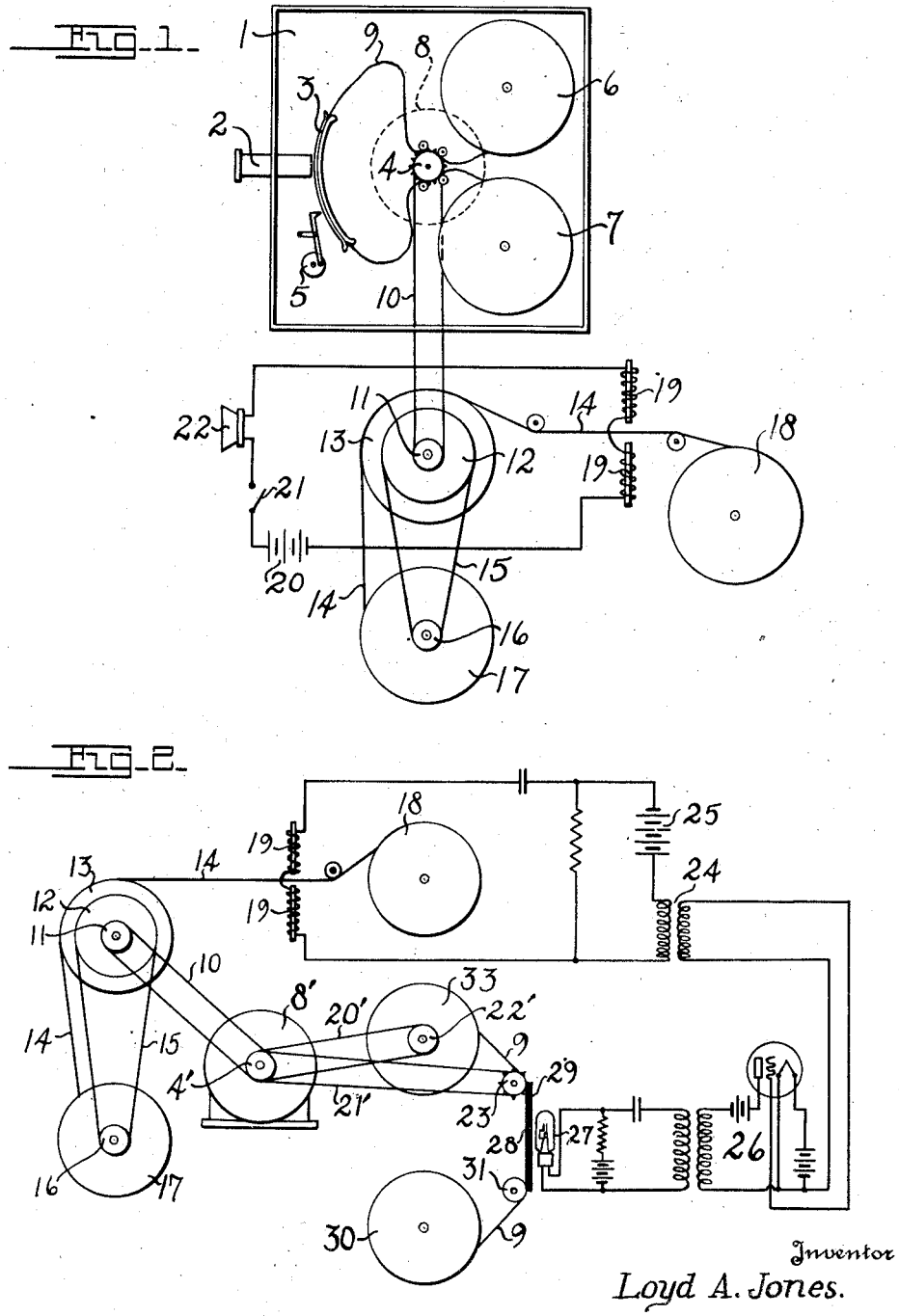
Inventor
Loyd A. Jones.

Patented July 12, 1932

1,866,712

UNITED STATES PATENT OFFICE

LOYD A. JONES, OF ROCHESTER, NEW YORK, ASSIGNOR TO EASTMAN KODAK COMPANY, OF ROCHESTER, NEW YORK, A CORPORATION OF NEW YORK

METHOD OF MAKING COMBINED SOUND AND PICTURE RECORDS

Application filed February 5, 1930. Serial No. 426,111.

This invention relates to a method of making synchronized sound and motion picture records on a common film. In making photographic sound records of the type in which the record consists of a band of uniform width having transverse bands of various densities, it is necessary for reproduction that this record be a positive.

It is moreover desirable that this record be along the margin of a motion picture film bearing picture images. Positive pictures are frequently made by reversal on the originally exposed film, this being common in amateur work. While it would be possible to make the sound record on the original film at the time of exposure this does not, for various practical reasons yield as good sound reproduction as when the sound is made on a separate film. If this record is then printed on the picture film and the sound and picture records developed and redeveloped together, the sound record will be negative and the picture record positive.

I have invented a convenient method by which this may be avoided. I propose to make the original sound record, simultaneously with the picture, magnetically on a steel wire by the Poulsen method, this being an exceedingly simple process requiring only readily portable apparatus and this well adapted for armateur use.

The record is then transformed into a photographic record which is printed on the undeveloped sensitize film carrying the latent picture record. The film is then submitted to a reversal process yielding positive picture and sound records.

Reference will now be made to the accompanying drawing wherein the same reference characters denote the same parts throughout and in which:

Fig. 1 indicates diagrammatically the apparatus for making the original records;

Fig. 2 indicates diagrammatically the apparatus for printing the sound record on the film.

In Fig. 1 there is shown schematically a motion picture camera 1 having the usual lens mount 2, film exposure gate 3, sprocket 4, claw pulldown 5, and reels 6 and 7. The complete mechanism need not be described in detail being of the type shown for instance in the patent to Wittel, 1,676,594, July 10, 1928. The camera is operated by a motor indicated in dotted lines at 8, and film 9 passes through it in the usual way.

Driven by belt 10 from a pulley on the motor shaft is a pulley 11 of the sound reproduction mechanism of the Poulsen type. This is on a shaft with a larger pulley 12 and a driving pulley 13 for the magnetic wire 14. A driving belt 15 passes over pulley 11 and also on a pulley 16 by which the take-up reel 17 is frictionally driven. The pulley 13 is the speed controlling and main driving element.

Wire 14 passes between two electromagnets 19 in circuit, with a battery 20, switch 21 and microphone 22.

The operation of this apparatus is obvious. The film is driven through the camera and the wire between the magnets synchronously and at uniform speeds such as may be required for practical reasons. The wire may have the same speed as the film or any relative speed to it; but preferably moves much more rapidly than the film, its relative speed being determined by the driving ratio. The camera records the visible action and the Poulsen system the sound in the usual way.

In Fig. 2 there is shown schematically a system for making a photographic record from the magnetic record. Some of the elements are the same as in Fig. 1. Wire 14 is passed from supply reel 18, between electromagnets 19 around the speed control and driving pulley 13 to the take-up reel 17. The pulleys 11, 12 and 16 and belt 15 functions as above described. Pulley 11 is driven by belt 10 from a pulley 4' on the shaft of motor 8'. Similar pulleys drive by means of belts 20' and 21' the pulley 22' and sprocket 23. Pulley 22' drives the take-up reel 33 frictionally.

Electromagnets 19 are in circuit with battery 25 and transformer 24, connected in a suitable system, designated 26 as a whole, by which a photographic record is made on the film 9, this being the undeveloped film bearing the latent images made in the camera 1. The particular system employed is immaterial to my invention, the one chosen for illustration being that shown in Fig. 1 of the United States patent to Case, No. 1,605,527, granted Nov. 2, 1926, in which the modulated light from lamp 27 falls through a slot 28 in plate 29 upon the film 9 as it is drawn from supply reel 30, over roller 31, and sprocket 23 to the take-up reel 33. The drive ratio for the two records will, of course, be such that this sound record is properly synchronized with the picture record. The particular method of controlling the starting point and maintaining the records in synchronization is not a part of the present invention.

The film 9 bearing the latent sound and picture records is then submitted to a known reversal process such as that described in the United States patent to Capstaff, No. 1,460,703, granted July 3, 1923 and positive silver sound and picture images are formed therein.

It will thus be possible for an amateur to take sound records with comparatively simple recording instrument, send the wire and film to a central processing station where the sound record is transformed into a photographic one. He receives back the single film which he can use in reproduction where portability is not so necessary as in recording.

The magnetic system offers particularly the advantages of simplicity in recording and is of particular advantage at that point.

It is to be understood that any type of photographic record may be made, varying either in density or in area. I do not restrict my invention to the details here shown and described but contemplate as included therein all equivalents and modifications falling within the scope of the appended claims.

Having thus described my invention, what I claim as new and desire to secure by Letters Patent is:

1. The method of making photographic sound and picture records that comprises exposing a sensitized film band in a motion picture camera, thus forming a latent picture image thereon, making a magnetic sound record in a metallic carrier, translating the magnetic sound record into a latent photographic record upon the said sensitized film band carrying the latent picture image and transforming the two latent images by a single reversal process into positive silver images.

2. The method of making synchronized photographic sound and picture records on a common film that comprises simultaneously exposing a sensitized film band in a motion picture camera, thus forming a latent picture image thereon, and making a magnetic sound record in a metallic carrier, translating the magnetic sound record into a latent photographic record upon the said sensitized film band carrying the latent picture image and transforming both latent images by a single reversal process into positive images.

Signed at Rochester, New York this 30th day of January, 1930.

LOYD A. JONES.